Patented Dec. 29, 1953

2,664,416

UNITED STATES PATENT OFFICE 2,664,416

VINYL HALIDE POLYMERIZATION WITH CYCLIC CATALYST

Harold F. Park, East Longmeadow, Mass., assignor to Monsanto Chemical Company, St. Louis, Mo., a corporation of Delaware No Drawing. Application November 19, 1949, Serial No. 128,481

3 Claims. (Cl. 260—92.8)

This invention relates to a process for the polymerization of vinyl halides. More particularly, the process relates to the polymerization of vinyl halides in the presence of a new class of catalysts.

One of the objects of this invention is to provide solid moldable polymers of vinyl halides.

A further object of this invention is to provide a process for producing solid moldable polymers of vinyl halides.

Another object is to provide a new class of catalysts for the polymerization of vinyl halides.

These and other objects are attained by polymerizing oxygen-free vinyl halides in contact with one or more cyclic organic or inorganic compounds which are thermally unstable at temperatures from 100° C. to 400° C. and which decompose through rupture of one or more rings to give a diradical with two unpaired electrons.

The number of such cyclic organic or inorganic compounds is fairly limited due to the restriction that they must be thermally unstable at temperatures between 100° C. and 400° C. and which must then break down by ring rupture to yield a diradical. Among the operative catalysts are cyclic succinyl peroxide, succinic anhydride, cyclic malonyl peroxide, barbituric acid, cyclic barium peroxide, cyclic beryllium peroxide, diazomethane, oxalyl peroxide, glycidol, cyclic phthaloyl peroxide, saccharin, etc.

An examination of the formulae of the above compounds shows that in spite of a wide variance in the number and type of atoms making up the molecule, each molecule contains a cyclic group which, on rupture, yields a diradical with two unpaired electrons.

The following examples are given in illustration and are not intended as limitations on the scope of this invention. Where parts are mentioned, they are parts by weight.

EXAMPLE I

Monomeric vinyl chloride containing substantially no oxygen was charged into a stainless steel bomb containing cyclic succinyl peroxide as a polymerization catalyst. 100 parts of vinyl chloride were used for each 0.1 part of catalyst. The bomb was then heated at about 260° C. under a pressure of 500 atmospheres for about 2 hours. Pressure was then released and the reaction product removed. A 92% yield of a solid, tough and resilient vinyl chloride polymer was obtained which could be easily molded and extruded by conventional means such as compression or injection molding or screw extrusion to yield transparent articles.

EXAMPLE II

Vinyl chloride containing substantially no oxygen was compressed to 250 atmospheres in the presence of 0.1 part of succinic anhydride per 100 parts of vinyl chloride. The compressed mixture was forced through a steel reaction vessel heated to 300° C. The mixture passed through the reaction zone in about 45 minutes and was then forced through a suitable valve into a cool atmosphere. More than 50% of the vinyl chloride was converted to polymer. The polymer was hard, transparent and easily molded.

EXAMPLE III

Oxygen-free vinyl chloride was polymerized under 180 atmospheres pressure in contact with 5 parts of saccharin per 100 parts of vinyl chloride. The polymerization was carried out at 350° C. to yield a solid moldable vinyl chloride polymer. This polymer was somewhat softer than those obtained in Examples I and II and articles molded from it were more flexible.

EXAMPLE IV

Oxygen-free vinyl chloride was polymerized under 250 atmospheres pressure at a temperature of 200° C. in contact with 0.01 part of cyclic barium peroxide per 100 parts of vinyl chloride. The polymer obtained was hard and transparent. It could be molded and extruded at temperatures slightly in excess of the conventional molding and extruding temperatures to produce hard resilient articles.

It is sometimes advantageous to conduct the process of this invention in the presence of a reducing agent. Many such materials are known and have been used in polymerization reactions. The preferred reducing agents for this invention are metallic salts of alpha, beta ethylenically-unsaturated carboxylic acids since this class of compounds does not produce color or haze in the polymer produced. Examples of such compounds are copper acrylate, nickel maleate, lead methacrylate, etc. Other reducing agents which may be used are quinones, organic sulfinates, aldehydes, amines, alcohols, thio-acids, mercaptans, ascorbic acid and sulfur dioxide.

EXAMPLE V

Oxygen-free vinyl chloride was polymerized under a pressure of 250 atmospheres at 250° C. in contact with 5 ppm. of nickel acrylate and 0.1 part of phthaloyl peroxide per 100 parts of vinyl chloride. The reaction was completed in about 3 hours to yield a clear, hard and tough polymer which could be easily molded by conventional methods.

It is essential that the vinyl halides used in the process of this invention be substantially oxygen-free. Amounts of oxygen as small as 0.06% by weight easily destroy the beneficial effects of the catalysts of this invention.

In place of the vinyl chloride used in the examples other vinyl halides or mixtures of vinyl halides with other polymerizable ethylenically unsaturated compounds may be used. Thus, vinyl fluoride, vinyl bromide or vinyl iodide may be polymerized alone or in conjunction with vinylidene compounds such as vinylidene chloride, vinylidene fluoride, 1,1-chlorofluoroethylene; vinyl esters including vinyl acetate, vinyl butyrate, vinyl laurate, vinyl stearate, etc.; vinyl ethers including vinyl methyl ether, vinyl ethyl ether, vinyl octyl ether, etc.; acrylic acid, acrylonitrile, acrylic esters including methyl, ethyl, propyl, phenyl, etc. acrylates, acrylamide, alpha-substituted acrylic acids, nitriles, esters and amides such as methacrylic acid, methacrylonitrile, ethyl methacrylate, methacrylamide, methyl methacrylate, atroponitrile, etc.; the acids, esters and amides of alpha, beta ethylenically unsaturated dicarboxylic acids such as the fumaric, maleic, citraconic, itaconic, etc. acids, their esters and amides, etc.; ethylenically unsaturated hydrocarbons, both aromatic and aliphatic such as styrene, ring-substituted alkyl styrenes, alpha alkyl styrenes, vinyl naphthalene, vinyl diphenyl, isobutylene and other iso-olefines, butadiene, isoprene, piperylene, dimethyl butadiene; the halogen derivatives of vinyl hydrocarbons such as chlorostyrenes, fluorostyrenes, chloroprene, bromoprene; etc. If a copolymer is prepared by the process of this invention it should contain more than 50% by weight of vinyl halide.

EXAMPLE VI 70 parts of vinyl chloride were copolymerized with 30 parts of diethyl maleate in contact with 0.1 part of barbituric acid at 200° C. and 100 atmospheres pressure in the substantial absence of oxygen. A tough, flexible, easily molded copolymer was obtained.

The reaction conditions which may be used vary from 100° C. to 400° C. and from 25 to 500 atmospheres pressure. The particular conditions used in combination with the amount of catalyst determine the molecular weight and, consequently, the hardness and moldability of the polymer produced. In general, it may be said that a combination of 100° C., 500 atmospheres pressure and 0.01 part of catalyst will produce the highest molecular weight and the hardest polymer. In fact, such conditions may result in a polymer so high in molecular weight that it is not easily molded under conventional conditions, i. e., it is necessary to substantially raise pressures and temperatures used for molding or extrusion.

The amount of catalyst mixture used may vary between 0.01 part to 15 parts per 100 parts of vinyl halide. At the lower part of the range, polymerization is slow unless the higher temperature range is used, and the molecular weight of the polymer is relatively high. At from 3 to 5 parts, polymerization is quite rapid even at 100° C. and the product is so low in molecular weight that it approaches the lower limit of moldability. In order to obtain the most accurate control of the reaction rate and to produce an optimum range of moldable polymers, the amount of catalyst is preferably restricted to from 0.01 to 1.0 part per 100 parts of vinyl halide.

The reducing agent which is optional serves the purpose of activating the catalysts and increasing the reaction rate. It has little or no effect on the molecular weight of the polymer nor on the physical properties thereof. It should be used in quantities ranging from 0.1 to 15 parts per million parts of vinyl halide.

This invention provides a simple process for preparing relatively high molecular weight vinyl halide polymers which are easily molded and extruded under conventional conditions. It also makes it possible to obtain vinyl halide polymers ranging from soft and waxy to hard and resilient solids.

It is obvious that many variations may be made in the products and processes of this invention without departing from the spirit and scope thereof as defined in the appended claims.

What is claimed is:

1. A mass polymerization process which comprises polymerizing a vinyl halide at 100–400° C. and at a pressure of 25–500 atmospheres in contact with from 0.01 to 1.0 part of cyclic succinyl peroxide per 100 parts of vinyl halide.

2. A mass polymerization process which comprises polymerizing vinyl chloride at 100–400° C. and at a pressure of 25–500 atmospheres in contact with from 0.01 to 1.0 part of cyclic succinyl peroxide per 100 parts of vinyl chloride.

3. A mass polymerization process which comprises polymerizing vinyl chloride at 260° C. under 500 atmospheres pressure in the presence of 0.1 part of cyclic succinyl peroxide per 100 parts of vinyl chloride.

HAROLD F. PARK.

References Cited in the file of this patent

UNITED STATES PATENTS

| Number | Name | Date |
| --- | --- | --- |
| 1,874,107 | Lawson et al. | Aug. 30, 1932 |
| 2,047,398 | Voss et al. | July 14, 1936 |
| 2,380,710 | Stewart | July 31, 1945 |
| 2,414,934 | Denny | Jan. 28, 1947 |
| 2,496,390 | Guinot | Feb. 7, 1950 |
| 2,511,480 | Roedel | June 13, 1950 |

FOREIGN PATENTS

| Number | Country | Date |
| --- | --- | --- |
| 572,767 | Great Britain | Oct. 23, 1945 |
| 599,429 | Great Britain | Mar. 12, 1948 |
| 604,580 | Great Britain | July 6, 1948 |

OTHER REFERENCES

Ser. No. 307,933, Moser (A. P. C.), published June 15, 1943.